United States Patent

[11] 3,578,227

[72] Inventor Aime A. Gehri
Beverly, Mass.
[21] Appl. No. 868,961
[22] Filed Oct. 1, 1969
[45] Patented May 11, 1971
[73] Assignee Transitron Electronic Corporation
Wakefield, Mass.
Continuation of application Ser. No. 696,433, Jan. 8, 1968, now abandoned.

[54] METHOD OF BREAKING DICE
9 Claims, 4 Drawing Figs.

[52] U.S. Cl. .......... 225/2, 225/103
[51] Int. Cl. .......... B26f 3/00
[50] Field of Search .......... 225/2, 103, 96, 96.5, 98, 93

[56] References Cited

UNITED STATES PATENTS

| | | | |
|---|---|---|---|
| 3,105,623 | 10/1963 | Hobbs .......... | 225/103X |
| 3,206,088 | 9/1965 | Meyer et al. .......... | 225/2 |
| 3,396,452 | 8/1968 | Sato et al. .......... | 225/2X |

FOREIGN PATENTS

| | | | |
|---|---|---|---|
| 1,016,417 | 9/1957 | Germany .......... | 225/96.5 |

*Primary Examiner*—James M. Meister
*Attorney*—Wolf, Greenfield & Sacks

ABSTRACT: A means for breaking a semiconductor wafer that has been scored into a plurality of individual dice consisting of a roller mounted on a longitudinally extending shaft adapted to roll over a sandwich containing a scored wafer and a flexible band of metal longitudinally tensioned and positioned in alignment with and below the shaft.

2 Sheets-Sheet 1

INVENTOR
Aimé Albert Gehri
BY
Wolf, Greenfield & Hieken

Aimé Albert Gehri INVENTOR
BY
Wolf, Greenfield & Hieken

METHOD OF BREAKING DICE

This is a continuation of application Ser. No. 696,433, filed Jan. 8, 1968, now abandoned.

BACKGROUND OF THE INVENTION

The present invention relates to a means and method of separating scored wafers of thin, frangible material into a plurality of individual dice or chips.

In the semiconductor art, it is common to fabricate integrated circuits by techniques in which numerous individual circuits are simultaneously and substantially formed in a single wafer of material before being separated for subsequent processing. Following the formation of the individual integrated circuits in a single wafer, the wafer is scored to define each circuit from adjacent ones and then the individual integrated circuits are broken or otherwise separated from each other along the score lines. Heretofore, these individual circuits have been separated by hand operations or other means which include the use of rollers that roll over the scored wafer and press it against a resilient surface such, for example, as a rubber surface. Wafers have also been separated into individual dice in the semiconductor art by placing a wafer on an adhesive sheet and flexing it. In another method the wafer is placed on a piece of spring steel covered with wax. Thereafter, the wafer is sandwiched with a complementary piece of steel and the wafer is broken by flexing the spring steel sandwich. Such methods and means which have been practiced heretofore are not altogether satisfactory since the integrated circuits are often damaged when the wafer is broken along the score lines. As many as a 10 percent of the individual circuits formed in a wafer are damaged and rendered useless during this breaking process. Since the wafer has undergone considerable processing by the time it is broken, the monetary loss due to such damage is considerable. Furthermore, these processes are slow, cumbersome, and often only partially damage the integrated circuits, thus causing faulty units which may not be detected until a finished, integrated circuit is installed in a particular product.

SUMMARY OF THE INVENTION

The present invention is designed to improve the efficiency with which integrated circuits that are substantially and simultaneously formed on a single wafer may be separated into individual dice for subsequent processing. It is an object of the present invention to provide a mechanism for severing dice from a wafer along previously scored edges with little likelihood of damaging the surface of the wafer or the individual dice or chip that is formed from it. The present invention also provides a means and method by which losses during a separating process may be reduced from about 10 percent to about 2 to 3 percent.

It is also an object of the present invention to provide a method by which individual, integrated circuit chips may be formed with clean, sharp and unchipped edges.

A further object of the present invention is to provide a method for breaking individual dice or chips from a wafer containing a plurality of integrated circuits without using added material, thereby eliminating the requirement for subsequently cleaning individual dice or chips.

A further object of the present invention is to reduce the number of steps required in fabricating a semiconductor device subsequent to formation of the individual chips, thereby resulting in a better rejection rate than heretofore possible.

A still further object of the present invention is to provide a means and method by which individual chips or dice are broken from a wafer with uniform pressure applied with precise control.

SUMMARY OF THE INVENTION

In the present invention there is provided a flexible member secured at its ends and upon which a wafer is placed within a sandwich of various materials. A roller is fixed for reciprocal movement over the flexible member and is adjustable for engagement with it. A wafer, ordinarily of processed semiconductor material, is scored in a gridlike arrangement to form a plurality of break lines along which the individual dice or chips will be formed. Following insertion of the wafer to be fractured in a sandwich of various materials on the flexible member, the roller is rolled across it, breaking the wafer into a series of parallel strips maintained in fixed relation in the sandwich. Subsequently, the wafer is realigned on the band at 90°, and the roller is then rolled across it once more to further break the wafer into the individual dice. The dice as thus severed, may thereafter be removed from the sandwich and spread or separated from one another by a suitable mechanism.

These and other objects and advantages of the present invention will be more clearly understood when considered in conjunction with the accompanying drawings.

DETAILED DESCRIPTION OF THE PREFERRED EMBODIMENT

Figure 4:
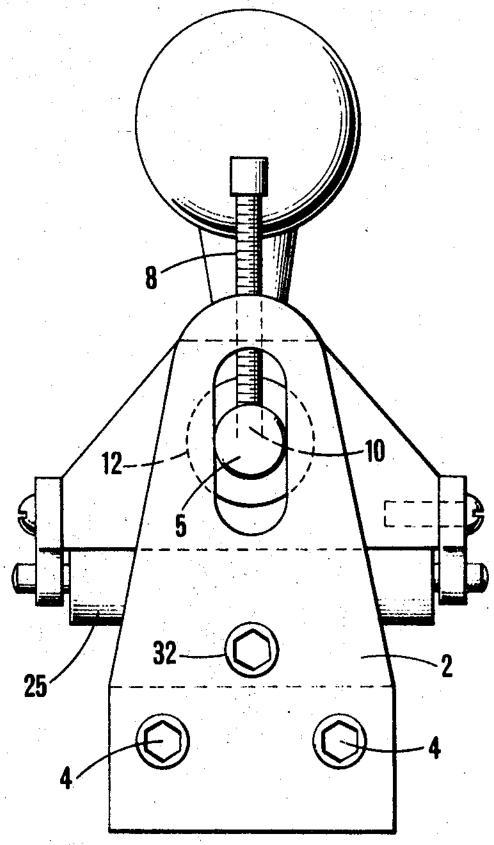
FIG. 4 is an end view along the line 4–4 of FIG. 1.

Referring to the drawings, there is illustrated a unit embodying the present invention having a base 1, preferably formed of a rectangular piece of metal with brackets 2 and 3 which are secured to opposite ends of the base 1 by machine screws 4 that thread through the bottom of the brackets into the ends of the base 1. Brackets 2 and 3 are substantially similar in construction to one another and extend vertically above the base 1 in planes parallel to one another. The shaft 5 is positioned above and extends parallel to the base 1 with the ends of the shaft 5 adjustably secured for vertical, adjustable movement with its ends in aligned slots 6 and 7 respectively in the brackets 2 and 3. Adjusting screws 8 and 9 extend downwardly through the tops of the brackets 2 and 3 respectively with each of these screws 8 and 9 in threaded engagement with the brackets and with the lower ends of the screw rotatably secured at their lower ends 10 (FIG. 4) in the shaft 5. Shaft 5 is secured against axial movement by collars 12 and 13 which are secured respectively to the shaft adjacent the inner surfaces of the brackets 2 and 3. The collars 12 and 13 are secured to the shaft 5 respectively by set screws 14 and 15 threaded through complementary holes in the collars against the surface of the shaft 5. Holes 6 are preferably vertically elongated to permit substantial vertical adjustment of the shaft 5.

A carriage 20 is supported on the shaft 5 for horizontal movement along its length. This carriage 20 includes a bushing 21 coaxial with and in sliding relation to the shaft 5. The bushing in turn supports a housing 22. The opposite sides of the housing 22 are provided with depending flanges 23 which may be secured to the housing by suitably means as, for example, screws 24. These flanges 23 extend downwardly to a lower tapered end. A roller 25 preferably of hardened steel, is supported on an axis by shaft 26 which extends longitudinally through the ends of the roller with the ends of this shaft 26 journaled in opposed and aligned holes in depending flanges 23, thereby supporting the roller beneath the housing 22 and shaft 5 and between the flanges 23. Extending upwardly from the housing 22 is a handle 27 which may be suitably secured to the housing by a threaded end 28.

Positioned below the shaft 5, preferably symmetrical with respect to a plane extending vertically through the shaft 5, is a flexible member comprising a metal band 29. This band 29 preferably has a width substantially equal to the width of the base 1 and is approximately the same width as the width of roller 25. This band is supported above the base 1 by end clamps 30 and 31. The clamp 30 comprises a male jaw 30A and female jaw 30B which are secured together in clamping relation by screws 30C which extend downwardly through jaw 30A and jaw 30B tightening the jaws of the clamp on opposite surfaces of one end of the band 29. The clamp 30 is held against the end bracket 2 by screw 32. The other end of the band 29 is clamped between male jaw 31A and the female jaw 31B of clamp 31 with the two jaws of the clamp 31 secured together by a screw 31C extending downwardly through the jaw 31A into the jaw 31B. The clamp 31 is tensioned toward end bracket 3 by screw 34. The screw 34 extends through an opening in the end bracket 3 and is threaded into the clamp 31. The screw 34 is adapted to move axially over a limited distance through the end bracket 3 and is normally tensioned in a direction outwardly of the bracket 3 by a helical spring 35 which is coaxial with the screw 34. The inner end of this spring 35 engages the outer surface of end bracket 3 while the outer end of the spring 35 engages the under edge of the head of screw 34. Thus, by adjusting the extent to which the screw 34 is threaded into the clamp 31, the band 29 may be tightened or loosened. Under normal operating conditions, the roller 25 extends downwardly with its lower tangential surface positioned in a plane below plane passing between the engaging surfaces of jaws of the clamps 30 and 31. Thus, when the roller 25 is rolled, it normally forces the band 29 downwardly against the tension of spring 35 under a pressure of about 5000 p.s.i. The exact amount of pressure, however, may be varied depending upon the size of the wafer being broken. A large wafer requires less pressure, and incidentally, a larger roller than a small wafer.

The band 29 may be formed of a variety of materials provided it is formed of a material which is flexible, has a relatively high modulus of elasticity, resists indentations made by a single die when squeezed between roller and band, and does not readily deform. It is also desirable to have the grain structure of the band following the direction of the roller motion. It has been found that a copper beryllium sheet having a thickness in the order of magnitude of 0.005 inch is satisfactory for these purposes. And while other materials, including for example, spring steel, and phosphor bronze spring of varying thicknesses may be useful, it has been found that the specific material and thickness referred to above are preferable.

Figure 3:
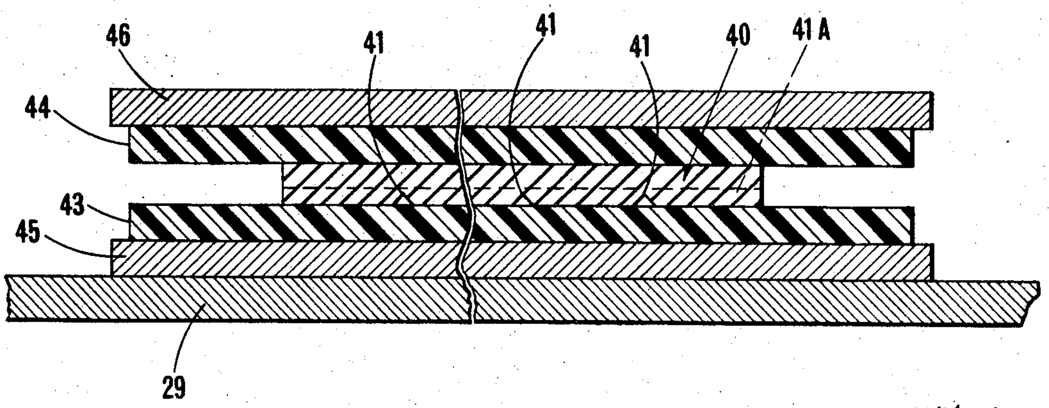
FIG. 3 is a greatly enlarged, somewhat schematic detail of a wafer positioned within a sandwich in turn positioned on the band.

A semiconductor wafer 40 illustrated in enlarged cross section in FIG. 3 which is normally broken into a plurality of dice, consists under ordinary circumstances of a very thin wafer having a thickness which varies depending upon the particular purpose for which the semiconductor material is being formed and which ordinarily has a thickness in the order of magnitude of 0.004 inch to 0.005 inch. This wafer when fabricated to the point at which it is to be inserted in the device of the present invention, consists essentially of a semiconductive wafer of silicon or germanium. The wafer has dimensions in the order of magnitude of 1 inch to 1 ½ inches in length and width and has formed thereon many hundreds and perhaps thousands of individually defined and formed electrical components or circuits. These components or circuits which are formed by known techniques are each independent of one another and are formed of a single wafer for economic purposes primarily. The wafers have been scored by a network of lines, perpendicular to one another, into rectangular or square configurations. These score lines define the periphery of each individual dice along which it is intended that the wafer should be broken. Thus, in addition to the score lines 41 illustrated in FIG. 3, there are a number of additional score lines 41A shown by dotted line, that extend perpendicular to this score lines 41.

In preparing these wafers for fracturing into individual dice, the operator sandwiches the wafer with the score lines faced downwardly between opposite facing plastic sheets 43 and 44. These sheets should have a length and width dimension suitable to overlap and extend beyond the periphery of the wafer 40. The sheets 43 and 44 may vary in thickness but it is found that a thickness in the order of 0.004 inch is preferred. This material may comprise a variety of deformable, organic, plastic material but preferably consists of a polyethylene material. Sandwiched on the outer surfaces of the sheets 43 and 44 is a pair of spring steel sheets 45 and 46 having dimensions at least equal to the dimensions of the wafer and preferably dimensions about equal to the dimensions of the sheets 43 and 44. These spring steel sheets preferably have a thickness in the order of 0.004 inch and are designed to be flexed when the roller 25 extends over them.

Figure 1:
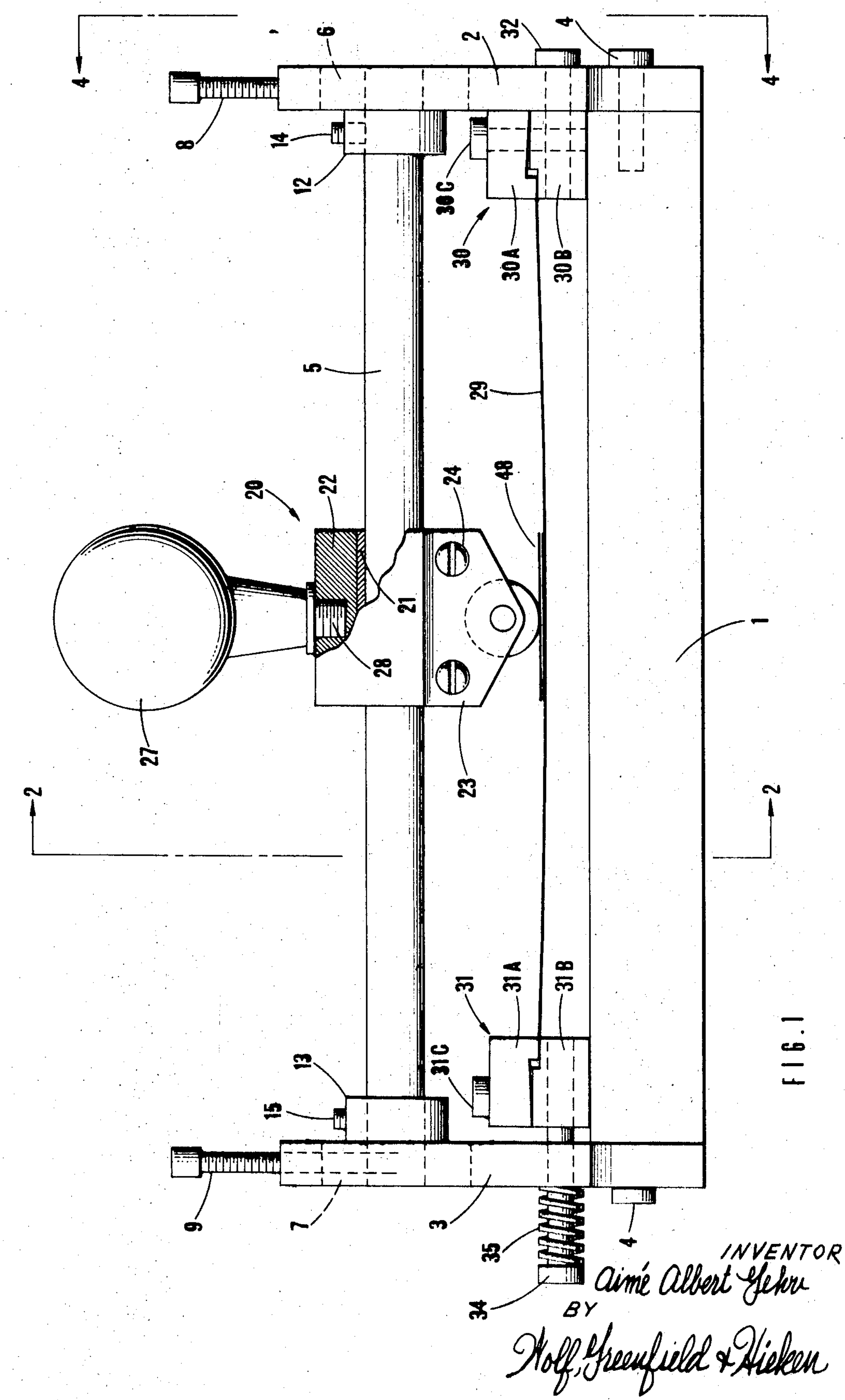
FIG. 1 is a longitudinal, partially fragmented elevation of a mechanism embodying the present invention.
Figure 2:
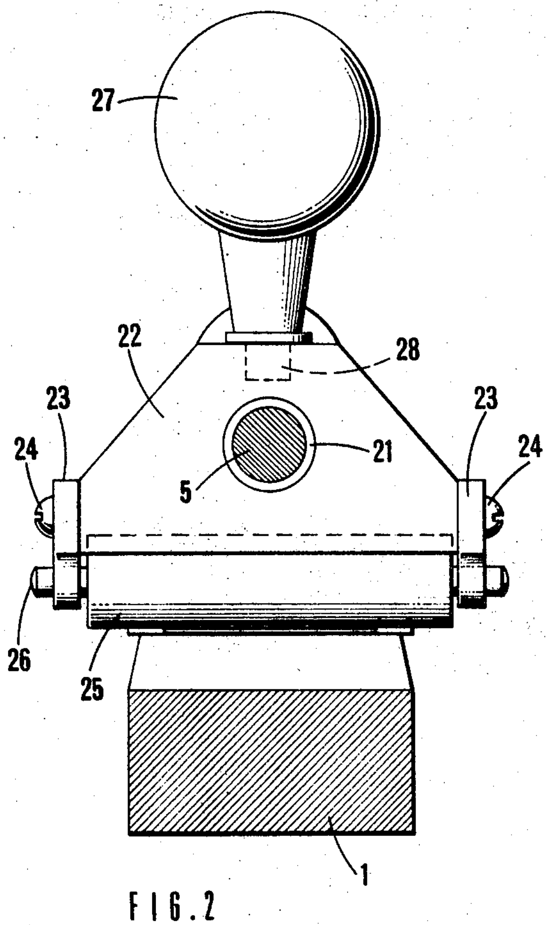
FIG. 2 is a cross section taken along the line 2–2 of FIG. 1.

In the operation of this device, the operator forms a sandwich, as illustrated in FIG. 3, and places it centrally on the band 29 with the roller 25 at one end of the shaft 5. The operator then moves the roller across and over the surface of the sandwich, generally indicated at 48 in FIG. 1 in a uniform movement. Following this movement of the roller over the sandwich 48, the sandwich is reoriented in a direction of 90° with respect to its original position and the roller is again moved over the sandwich, thus causing a fracture of the wafer on successive movements of the roller along the lines 41 and then 41A.

I claim:

1. A method of severing chips integrally formed on a wafer of semiconductor material and defined from each other by a plurality of orthogonally arranged scribed sets of lines on one surface of the wafer comprising supporting a flat flexible sheet rigidly at opposite ends thereof to enable the intermediate portion of said sheet to be flexed transversely of its ends, placing said wafer on said flexible sheet intermediate the ends of said sheet, progressively flexing said wafer and said sheet along a moving line parallel to one set of said lines whereby said chips are severed in parallel groups defined by said one set of lines, and thereafter severing chips within each of said parallel groups from each other.

2. A method as set forth in claim 1 wherein said step of progressively flexing said sheet comprises moving an arcuate surface along a straight line extending longitudinally of said sheet to cause said arcuate surface to effect a pressure on said sheet and cause said flexure thereof and with said sheet extending substantially in tangential directions on either side of said arcuate surface.

3. A method as set forth in claim 1 wherein said step of progressively flexing comprises urging an arcuate surface tangentially toward said sheet to apply pressure toward said sheet, moving said arcuate surface in a direction substantially normal to the axis of said arcuate surface, said portions of said sheet remote from said wafer extending from said line of tangency to the end of said sheet closer to said axis of said arcuate surface.

4. A method as set forth in claim 3 comprising retaining said arcuate surfaces nonresiliently for movement in said straight line as said sheet is progressively flexed.

5. A method as set forth in claim 4 further comprising repositioning said arcuate surface relative to said sheet in a direction normal to said straight line thereby to adjust the pressure applied to said sheet by said surface.

6. A method as set forth in claim 5 further comprising maintaining said sheet under longitudinal tension while said arcuate surface is moved thereover.

7. A method as set forth in claim 6 further comprising sandwiching said wafer between outer sheets of flexible metal substantially no thicker than the thickness of the wafer before flexing said sheet.

8. A method as set forth in claim 7 further comprising sandwiching said wafer between thin deformable sheets of shock-absorbing organic material.

9. A method as set forth in claim 6 further comprising repositioning said wafer on said sheet subsequent to severing said wafer along one of said set of lines.